United States Patent
Ono et al.

(10) Patent No.: US 6,755,316 B2
(45) Date of Patent: Jun. 29, 2004

(54) FUEL CAP

(75) Inventors: Takami Ono, Soja (JP); Shigeru Kayano, Soja (JP)

(73) Assignee: Asteer Co., Ltd., Okayama (JP)

( * ) Notice: Subject to any disclaimer, the term of this patent is extended or adjusted under 35 U.S.C. 154(b) by 211 days.

(21) Appl. No.: 09/938,108

(22) Filed: Aug. 23, 2001

(65) Prior Publication Data

US 2002/0074335 A1 Jun. 20, 2002

(30) Foreign Application Priority Data

Dec. 19, 2000 (JP) ........................................ 2000-385814

(51) Int. Cl.⁷ .............................................. B65D 41/04
(52) U.S. Cl. ................. 220/304; 220/378; 220/DIG. 33
(58) Field of Search ........................ 220/304, DIG. 33, 220/295, 378, 288, 298, 86.1, 86.2, DIG. 32

(56) References Cited

U.S. PATENT DOCUMENTS

| | | | | |
|---|---|---|---|---|
| 4,102,472 A | * | 7/1978 | Sloan, Jr. .................... | 220/304 |
| 4,690,293 A | * | 9/1987 | Uranishi et al. ........... | 220/86.2 |
| 4,785,961 A | * | 11/1988 | Kasugai et al. ...... | 220/DIG. 33 |
| 4,877,146 A | * | 10/1989 | Harris ....................... | 220/86.2 |
| 5,071,020 A | * | 12/1991 | Reutter ..................... | 220/303 |
| 5,415,316 A | * | 5/1995 | Pemberton et al. ........ | 220/288 |
| 5,480,055 A | | 1/1996 | Harris et al. | |
| 5,680,954 A | * | 10/1997 | Arnold et al. ............ | 220/304 |
| 5,794,806 A | | 8/1998 | Harris et al. | |
| 6,161,841 A | * | 12/2000 | Shaw ........................ | 277/642 |
| 6,336,482 B1 | * | 1/2002 | Cunkle et al. ....... | 220/DIG. 33 |
| 6,547,089 B2 | * | 4/2003 | Pozgainer et al. ......... | 220/304 |

\* cited by examiner

Primary Examiner—Nathan J. Newhouse
(74) Attorney, Agent, or Firm—Koda & Androlia

(57) ABSTRACT

There are provided firstly a fuel cap which irrespective of its type has a structure that there is no transpiration of gasoline vapor until the cap is fully open and secondly particularly a bayonet-type fuel cap which has a structure that there is no eruption of fuel under a pressure difference between a internal pressure of the tank and atmospheric pressure. In each case the fuel cap consists of a closure 3 fitting into the opening of a filler neck 4 and a handle 2 integral with the closure 3, and an upper seal ring 10 and a lower seal ring 1 for sealing the filler neck 4 are each fitted individually to the closure 3 positionally apart from the other.

1 Claim, 7 Drawing Sheets

FUEL CAP

BACKGROUND OF THE INVENTION

1. Field of the Invention

The invention relates to a fuel cap, for closing the opening of a filler neck connected to a fuel tank of automobiles, consists of a closure fitting into the opening of a filler neck and a handle integral with this closure.

2. Prior Art

To close the opening of a filler neck connected to a fuel tank of automobiles, a fuel cap is attached to the opening of a filler neck. The basic purpose of this fuel cap is to be removable easily as necessary for refilling while preventing what fuel of the tank leak out through the filler neck. Because of a seal ring is often used, to block any gaps between the fuel cap and the inner wall of the filler neck and thus to close the filler neck completely when the fuel cap is closed. Normally, a fuel cap comprises of a closure fitting into the opening of a filler neck and a handle integral with this closure, and a seal ring is applied to the closure.

Fuel caps are to be classified roughly in bayonet-type and screw-type. With a bayonet-type fuel cap, the closure is disengaged from the filler neck by the handle being turned through approximately 90°; thus opening and closing are easy. With a screw-type fuel cap, on the other hand, the handle is rotated through more than 360° to unscrew the closure from the filler neck, and an ample sealing effect with respect to leaking out of fuel is obtained when the cap is closed.

In recent years, the view over environmental pollution becomes severe, and reductions of which not only in exhaust gas but also in gasoline vapor transpiring into the atmosphere from fuel (gasoline) have been demanded. On this viewpoint, the opening time of a fuel cap (from the beginning of opening to the fully opened) or the closing time (from the beginning of closing to the fully closed) are regarded as problems. For instance, in the case of the screw-type fuel cap, improvements to the problem of that, because the closing time and opening time are both long, the time for which gasoline vapor is allowed to transpire is to be longer, have been required.

On the other hand, with a bayonet-type fuel cap, it is favorable that the closing time and the opening time are both shorter than a screw-type fuel cap by reason of the turning range of the closure is narrow. However, by reason of the turning range of the closure is narrow, there is in apprehension of opening that the closure turns in reverse under the impact of an accident, and the sealing effect is deteriorative when lateral load impressed compared to a screw-type fuel cap. In addition, the advantage of easy opening and closing includes problem of that is possible to erupt fuel under a differential pressure between the internal pressure of the tank and atmospheric pressure. These shortcomings of bayonet-type fuel cap are good reasons for drawing that screw-type cap has been seen more often in the market in recent years.

A number of technologies for solving or ameliorating this problem associated with bayonet-type fuel cap has been proposed. Such proposals are found in, for example, the U.S. Pat. Nos. 5,480,055 and 5,794,806. In these, to prevent opening of the closure even under the impact of an accident, the turning range of the closure is set over 90° to 360° (normally 180°), and the handle idles to the closure within a range of fixed angle (about 90°) as from the beginning of opening (the idling range is called 'lost motion'). However, the problem of which is possible to erupt fuel under a differential pressure between the internal pressure of the tank and atmospheric pressure has not been solved.

SUMMARY OF THE INVENTION

Accordingly, the present inventors conducted an investigation to find a structure, firstly, of which is not to transpire gasoline vapor while the fuel cap is opening, and secondly, a structure with a bayonet-type fuel cap, of which is not to erupt fuel under a differential pressure between the internal pressure of the tank and atmospheric pressure. In other words, the points of what should be achieved on a fuel cap are; (1) in the case of a screw-type fuel cap, the structure of which prevent to transpire gasoline vapor until the cap is fully opened while utilizing advantage of high sealing effect, and which is to secure a sealing effect even when the closure turns under an accidental impact; and (2) in the case of a bayonet-type fuel cap, the structure of which is to prevent eruption of fuel caused by a differential pressure between inside and outside of the tank and which is to secure a sealing effect even when the closure turns under an accidental impact; and furthermore, (3) the structure of which is to raise sealing effect when the fuel cap is closed and to reduce or prevent transpiration of gasoline vapor as normal state.

The present invention provides a fuel cap, for closing the opening of a filler neck connected to a fuel tank of automobiles, consists of a closure fitting into the opening of a filler neck and a handle integral with the closure, and mounts the upper and the lower seal rings individually on the closure at positionally apart from the other. The focus of the present invention is to raise sealing effect, and by using a plurality of seal rings, it is achieved to reduce or prevent gasoline vapor transpiring through the seal rings (rubbers).

The upper seal ring and the lower seal ring provide unequal sealing effects; the upper seal ring provides a high sealing effect when the fuel cap is closed as well as a seal ring used in prior arts, and the lower seal ring have a structure (cross-sectional shape) and a positional relationship to a filler neck in order to secure a sealing effect while opening or closing of a fuel cap.

As a structure (cross-sectional shape) for contributing to secure a sealing effect, the lower seal ring whose working differs from a seal ring used in prior arts, is to be a cross-sectional shape which consists of a ring base part fitted to the closure; an umbrella-shaped part provided extending with downward pitch from the ring base part toward the inner wall of the filler neck; and an elastic support part, provided at the edge of the umbrella-shaped part, for pressing against the inner wall of the filler neck. In other words, the cross-sectional shape of the lower seal ring consists of an added lip part provided extending with downward pitch from the elastic support part toward the closure. Moreover, the lower seal ring, to obtain a positional relationship to the filler neck properly, is provided by pressure welding to the contact surface which is formed as a substantially vertical cylindrical side face with a concentric and a substantially same diameter as the lower seal ring on the inside of the filler neck, at range scale of from the fully closed position up to when the closure is completely pulled out so as to be removed from the filler neck. For example, in the case of closing a fuel cap by screwing the closure into the filler neck, the contact surface is formed as a substantially vertical cylindrical side face with a concentric and a substantially same diameter as internal threads on the inside of the filler neck; due to the lower seal ring is force to pass through the internal thread of which is formed inside of the filler neck.

This lower seal ring provides a sealing effect with pressure welding of the elastic support part to the inner wall of the filler neck, i.e. the contact surface. Besides, (a) there is no deterioration in sealing effect with pressure welding of the elastic support part to the inner wall of the filler neck when the closure leans under impact from outside. Even if the elastic support part were to detach from the inner wall of the filler neck, the portion of pressure welding to the inner wall of the filler neck is settled between the elastic support part and the lip part. Moreover, the passage of gasoline vapor and fuel is physically blocked as well as sealing effect; even (b) when an internal pressure of the tank greater than atmospheric pressure acts from the inside, or (c) when fuel almost erupts under the internal pressure of the tank, the pressure of gasoline vapor or fuel pushes open the umbrella-shaped part from below, and the portion of pressure welding to the inner wall of the filler neck is settled between the elastic support part and the lip part. The lower seal ring is also available as being a check-valve.

In the case of that the present invention is applied to a screw-type fuel cap, the structure of the upper seal ring and the lower seal ring mounts individually on the closure at positionally apart from the other so that the upper seal ring is ordered unsealing state after the beginning of which the closure is rotated, the lower ring is ordered unsealing state on the verge of the closure is deviated from the opening of a filler neck. In the case of that the present invention is applied to a bayonet-type fuel cap, the structure of the upper seal ring and the lower seal ring mounts individually on the closure at positionally apart from the other so that the upper seal ring is ordered unsealing state after the beginning of which the closure is rotated, the lower ring is ordered unsealing state on the verge of the closure is deviated from the opening of a filler neck. In a screw-type fuel cap, the outer diameter is assignable by which the lower seal ring comprises the outer diameter passing through the internal thread on the inner wall of the filler neck wherein screwing the external thread on the closure, and also comprises the outer diameter pressing contact with the inner wall of the filler neck below the internal thread.

Of course, the invention is also applicable to a bayonet-type fuel cap (of an improved type) wherein there is no lost motion in the closing direction but a predetermined angle of lost motion within the turning range in the opening direction, thereby, the issue of fuel erupting under internal pressure of the tank is resolvable. In this bayonet-type fuel cap, the outer diameter of the lower seal ring is assignable by which the lower seal ring comprises the outer diameter passing through the engagement ring on the inner wall of the filler neck wherein engaging the engagement projection on the closure, and also comprises the outer diameter pressing contact with the inner wall of the filler neck below the engagement ring.

The lower seal ring is favorable to conform to these outer diameter conditions and to be the cross-sectional shape consisting of a ring base part, an umbrella-shaped part, an elastic support part and a lip part as mentioned above, and to set an optimum detached locational relationship to the upper seal ring by the relationship of contact surface which is formed in the filler neck.

DETAILED DESCRIPTION OF THE INVENTION

Preferred embodiments of the invention will now be described.

Figure 1:
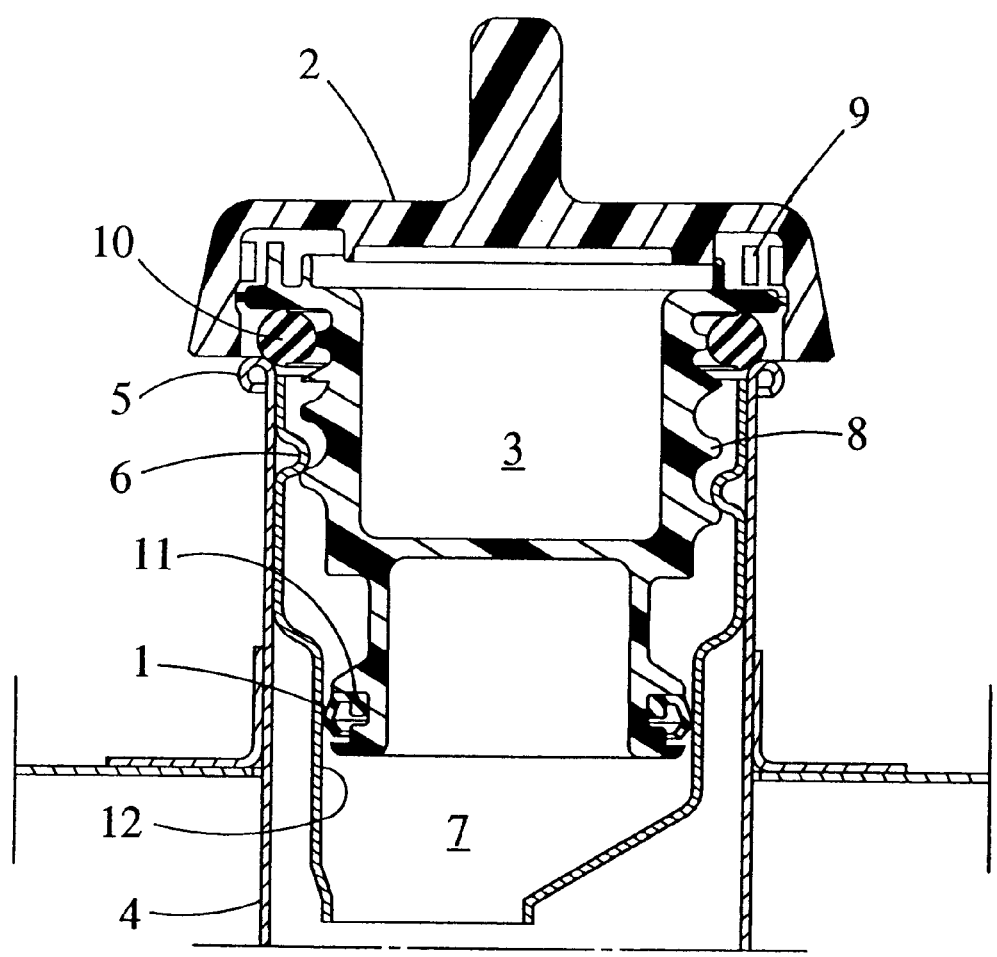
FIG. 1 is a sectional view of a screw-type fuel cap to which the present invention has been applied.

When the invention is applied to a screw-type fuel cap, as shown in FIG. 1, a synthetic resin handle 2 is integrally attached to a synthetic resin closure 3 which fits into a filler neck 4 through an opening 5 thereof, and the schematic structure is thus substantially the same as in related art A filler mouth tube 7 provided with a internal thread 6 is fixed in the filler neck 4, and an external thread 8 of the closure 3 screws into the internal thread 6. The closure 3 and the handle 2 may alternatively be molded integrally. In this example, the handle 2 and the closure 3 are connected by way of a latch mechanism 9 (details not shown).

An upper seal ring 10 is made of an oil-resistant rubber and is fitted around the upper end of the closure 3 so as to press against the upper edge of the opening of a filler neck 5 when the cap is closed. The upper seal ring 10 is structurally no differences from that of a related art. A lower seal ring 1 is fitted in an annular groove 11 provided in around the lower end of the closure 3 and presses against a contact surface 12 formed in the bottom of the filler mouth tube 7. This contact surface 12 consists of a substantially vertical cylindrical side face (more strictly, an inverted conical side face having a slight slope) concentric with and of substantially the same radius as the internal thread 6, and has a smooth surface for the lower seal ring 1 to make sliding contact with. As a result of a plurality of seal rings being used like this, the concentration of gasoline vapor transpiring through the rubber seal rings is certainly reduced to below that in related art.

Figure 2:
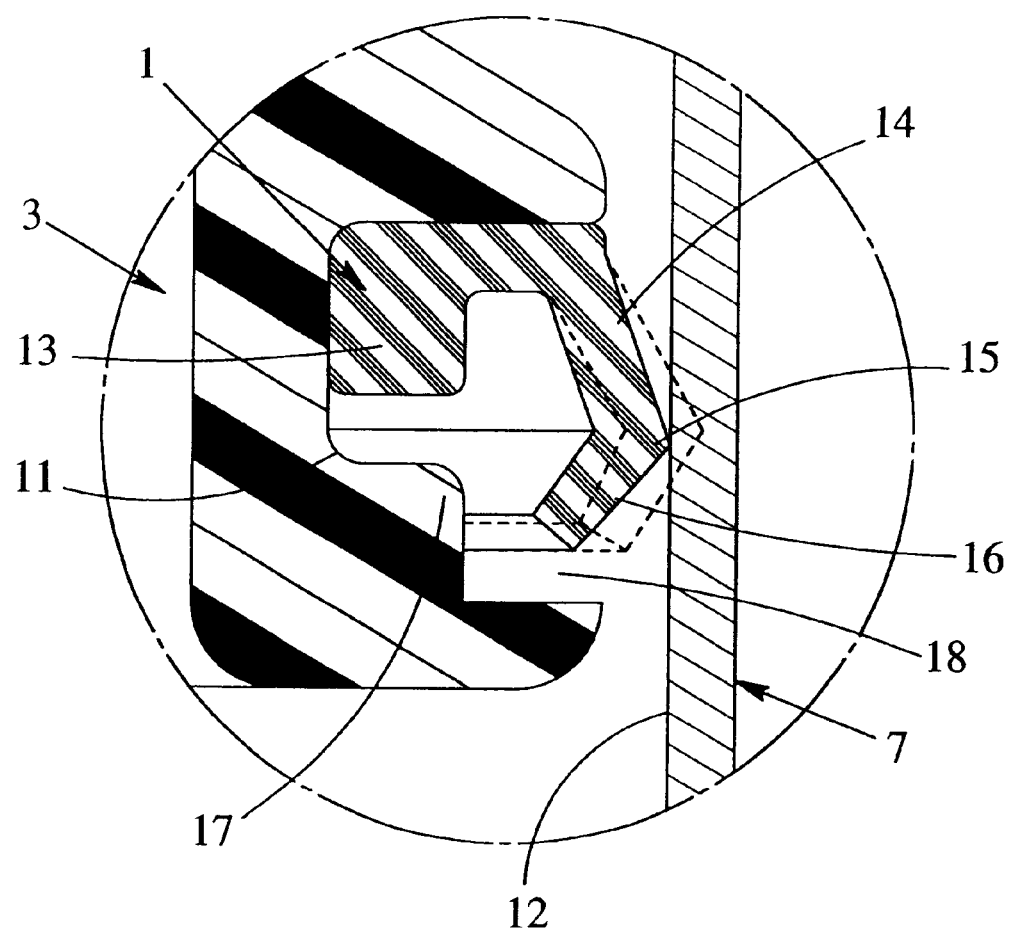
FIG. 2 is an expanded sectional view of the lower seal ring.

The basic sealing of the fuel cap is effected by the upper seal ring 10, and the lower seal ring 1 is made to perform an auxiliary and check-valve function. To this end, as shown in FIG. 2, the cross-section of the lower seal ring 1 consists of a ring base part 13 fitted in the annular groove 11 of the closure 3; an umbrella-shaped part 14 provided extending with a downward gradient from the upper part of this ring base part 13 toward the contact surface 12 of the filler mouth tube 7; an elastic support part 15 provided at the end of this umbrella-shaped part 14 for pressing against the contact surface 12; and a lip part 16 provided extending with a downward gradient from the elastic support part 15 back toward the closure 3. If the maximum outer diameter of the end of the umbrella-shaped part 14 (the outer periphery of the elastic support part 15) is larger than the inner diameter of the contact surface 12, then the elastic support part 15 certainly presses against the contact surface 12 and produces a sealing effect. Thus the cross-section of the lower seal ring 1 bends out convexity with respect to the contact surface 12 and the outer diameter of the end of the lip part 16 is smaller than the inner diameter of the contact surface 12. Therefore, the lower seal ring 1 is to be inserted easily into the filler mouth tube 7 and resistance to the fuel cap on closing is lightened.

Figure 3:
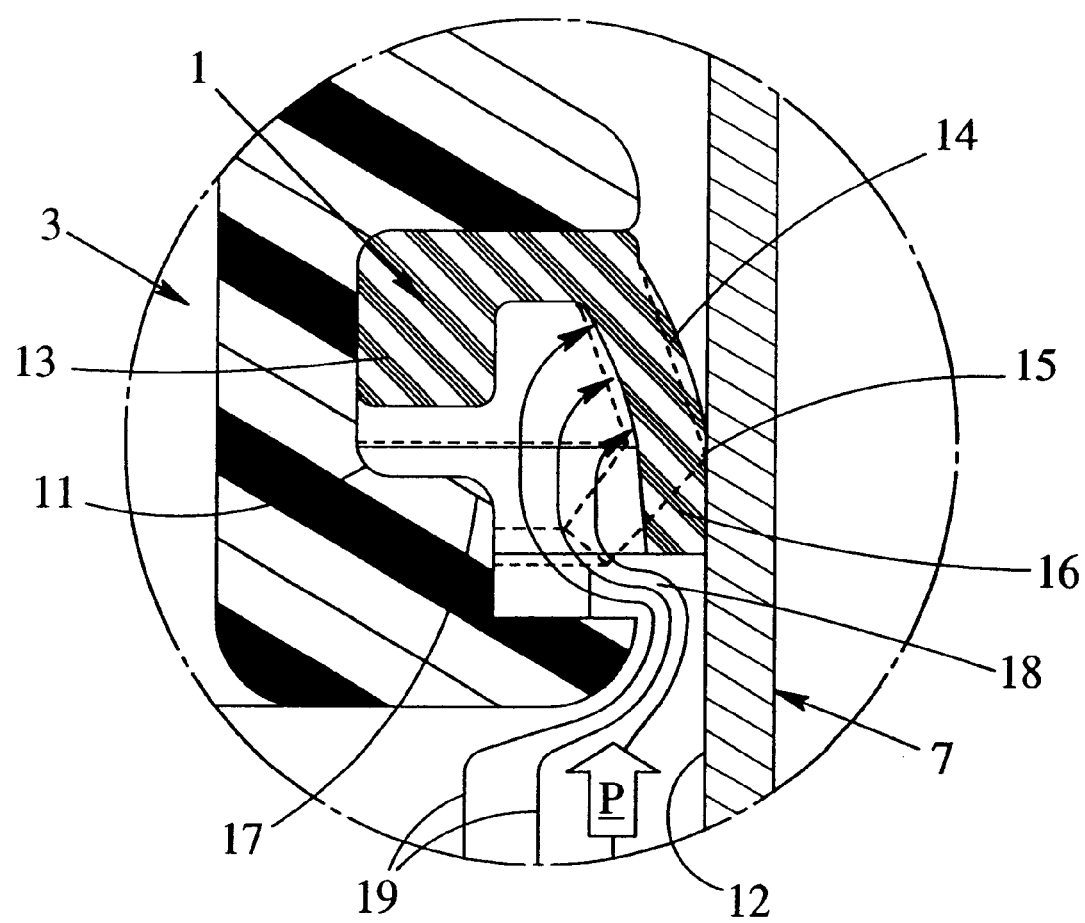
FIG. 3 is an expanded sectional view corresponding to FIG. 2 showing deformation of the lower seal ring occurring when an internal pressure of the tank greater than atmospheric pressure acts from the inner side.

In this example, a step part 17 is also formed in the lower edge of the annular groove 11 of the closure 3, and an inflow gap 18 is thereby formed between the end of the lip part 16 and the step part 17. Consequently, for example as shown in FIG. 3, when an internal pressure P of the tank greater than atmospheric pressure acts from the inner side, gasoline vapor 19 flows through the inflow gap 18 to the inner side of the umbrella-shaped part 4 and pushes the umbrella-shaped part 14 radically outward. As a result, the higher the internal pressure P of the tank is the more strongly the elastic support part 15 which is pressed against the contact surface 12; in some cases the lip part 16 will also come into contact with the contact surface 12; and transpiration of the gasoline vapor 19 is prevented. Moreover, although a separate description of it will be omitted when fuel itself tends to erupt, this eruption is prevented by the lower seal ring 1 in the same way. These are functions of the lower seal ring 1 as a check-valve.

Figure 4:
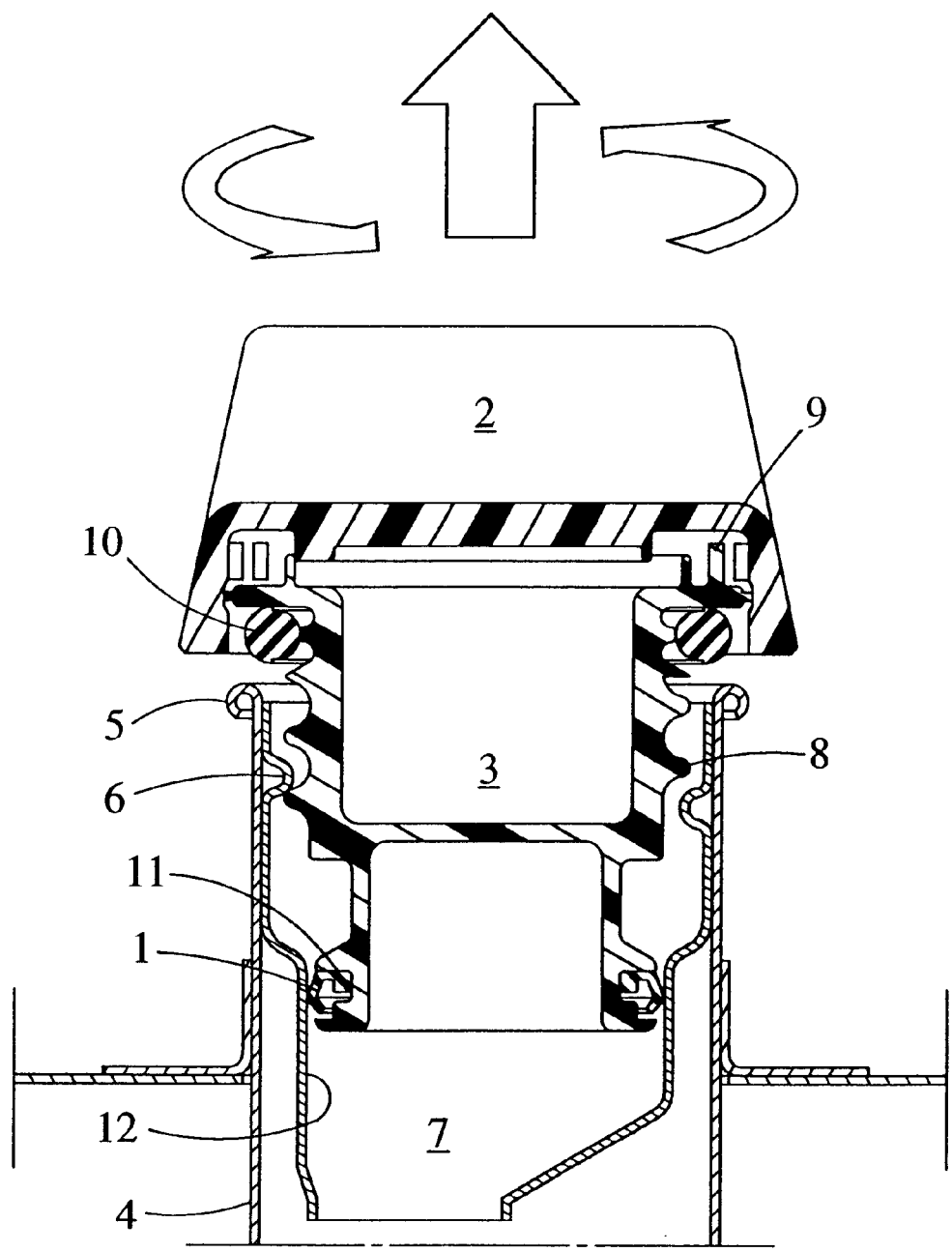
FIG. 4 is a sectional view corresponding to FIG. 1 showing the fuel cap when a handle thereof has been turned and a closure thereof has started to be removed.

On opening of the fuel cap of this example, when the handle 2 starts to be turned in the opening direction, the latch mechanism 9 causes the closure 3 to start rotating in the opening direction also. Then, because the upper seal ring 10 presses against the upper edge of the opening of a filler neck 5 substantially from above, as shown in FIG. 4 the upper seal ring 10 soon unseats from the upper edge of the opening of a filler neck 5 and loses its sealing effect. However, in the present invention, as shown in the same FIG. 4, even at the stage where the sealing effect of this upper seal ring 10 has been lost, the lower seal ring 1 is still pressing against the contact surface 12 of the filler mouth tube 7 and preventing the transpiration of gasoline vapor and the eruption of fuel.

Figure 5:
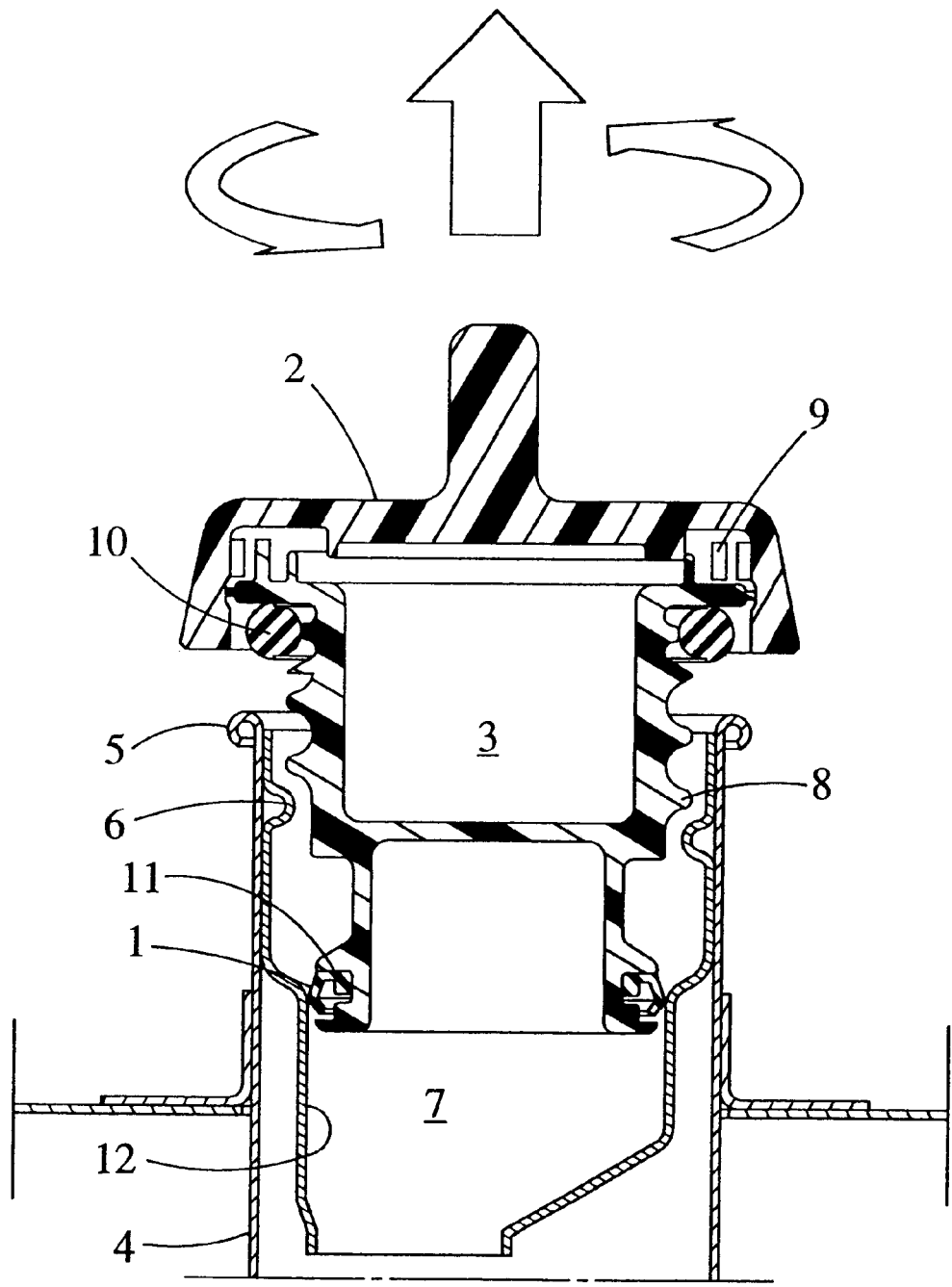
FIG. 5 is a sectional view corresponding to FIG. 1 showing the fuel cap when the closure has been almost completely removed from a filler neck pipe.

At the stage where the handle 2 has been turned further and the internal thread 6 of the filler mouth tube 7 has completely disengaged from the external thread 8 of the closure 3, i.e. the stage where the fuel cap is completely removed from the filler neck 4, the pressing of the lower seal ring 1 against the contact surface 12 ends. Or, paradoxically, as shown in FIG. 5, the contact surface 12 is provided so as to have at least the distance range of up to when the closure 3 is completely pulled out and removed from the filler neck 4, and the lower seal ring 1 produces a sealing effect over the distance range. It is by this means that the transpiration of gasoline vapor is prevented while the fuel cap is being opened. And also while the fuel cap is being closed, with the only difference being that the order is reversed, the lower seal ring 1 provides a sealing effect and the transpiration of gasoline vapor is reduced.

Here, the outer diameter of the lower seal ring 1 (the outer periphery of the elastic support part 15) and hence the inner diameter of the contact surface 12 (slightly smaller than the outer diameter of the lower seal ring 1) are preferably made substantially the same as the inner diameter of the internal thread 6. Then, on closing of the fuel cap, when the lower seal ring 1 is pressed against the contact surface 12, the external thread 8 of the closure 3 and the internal thread 6 of the filler mouth tube 7 automatically become concentric and could be screwed together easily. In this case, the lower seal ring 1 may preferably be positioned in relation to the screwing the external thread 8 into the internal thread 6 so that the lower seal ring 1 starts to press against the contact surface 12 when the external 8 have screwed into the internal thread 6 through between 0° and 90°.

Figure 6:
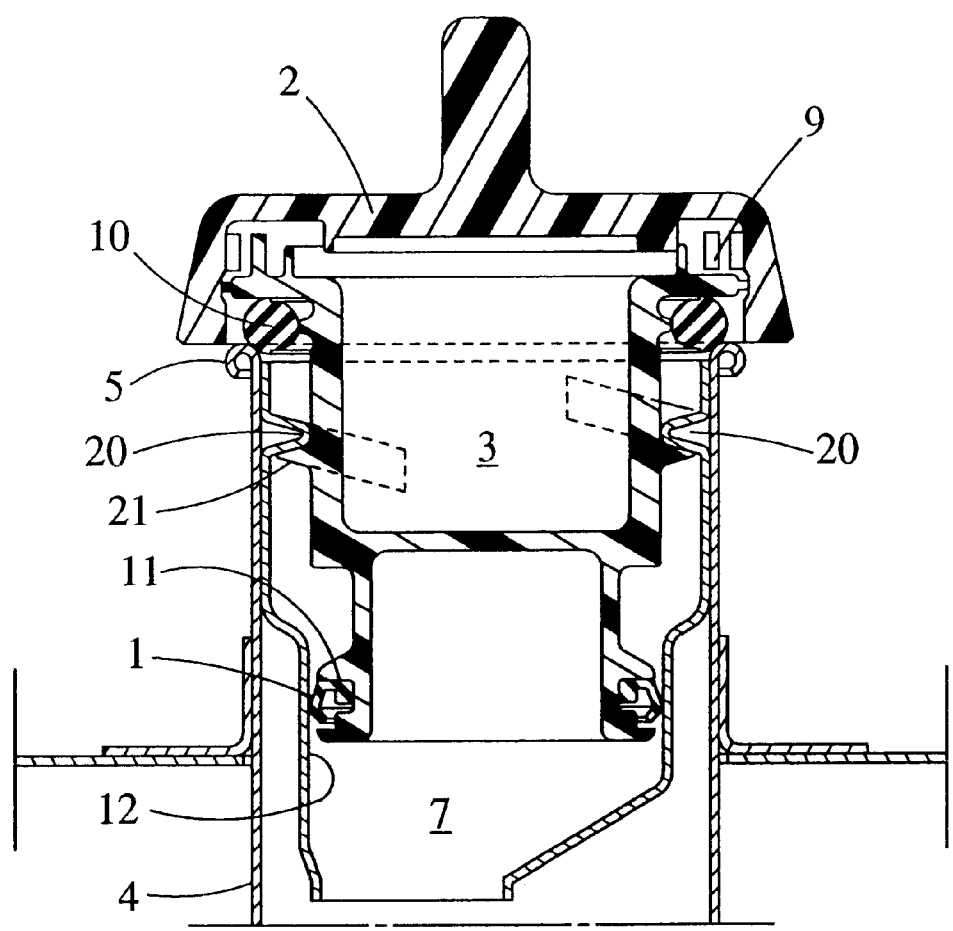
FIG. 6 is a sectional view showing a bayonet-type fuel cap to which the present invention has been applied.
Figure 7:
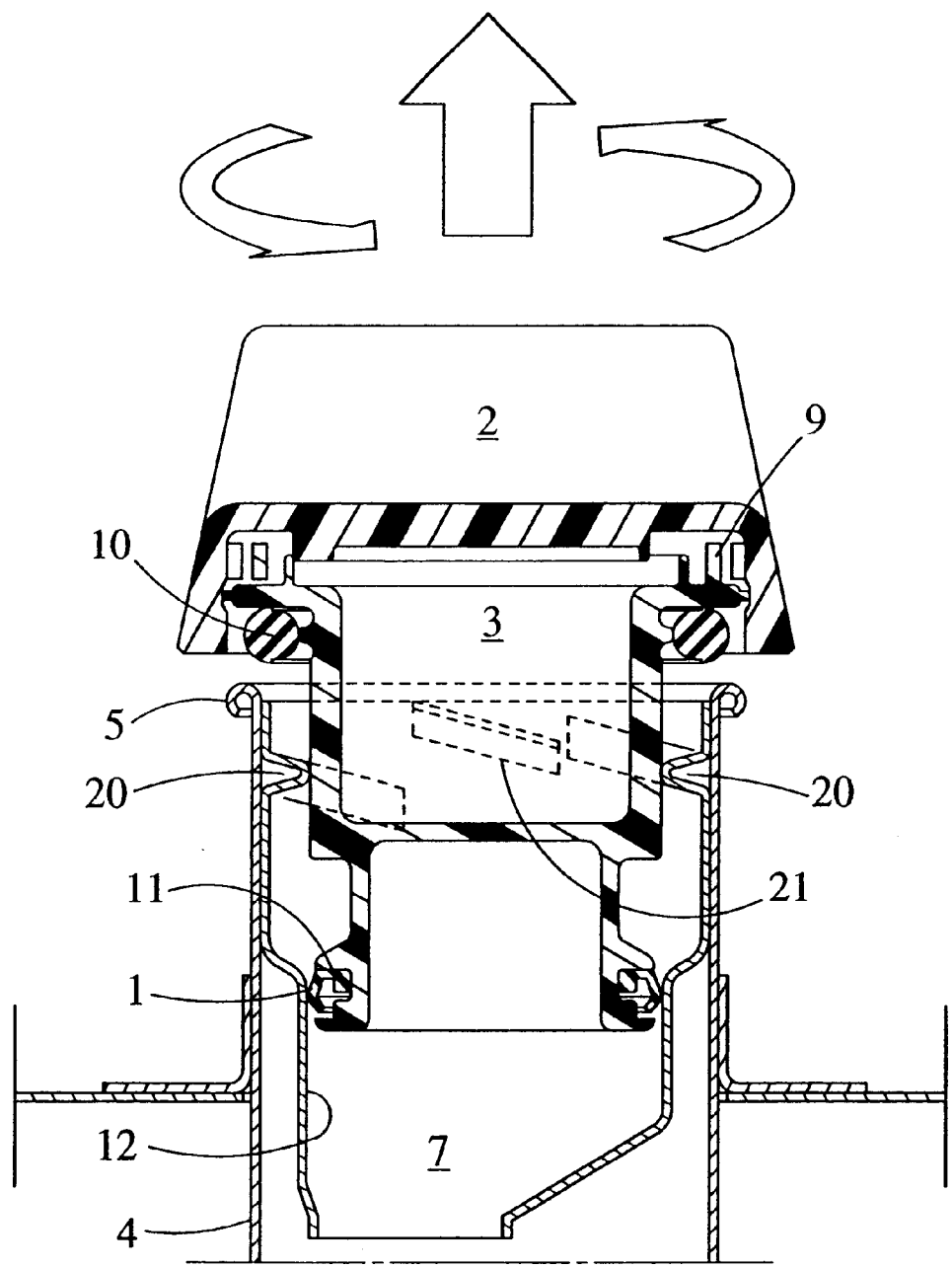
FIG. 7 is a sectional view corresponding to FIG. 6 showing the fuel cap when a handle thereof is being turned to remove the closure thereof from a filler neck pipe.

Also in the case of a bayonet-type fuel cap, the present invention could be applied in the same way as in the screw-type fuel cap described above and works in the same way. On closing of the fuel cap, as shown in FIG. 6, the lower seal ring 1 produces a sealing effect along with the upper seal ring 10 and reduces the rate of permeation of gasoline vapor. And on opening of the fuel cap, as shown in FIG. 7, even when the closure 3 is rotated and engagement projections 21 on the closure 3 are disengaged from engagement ring 20 on the filler mouth tube 7 and the whole fuel cap is lifted so that the upper seal ring 10 unseats from the upper edge of the opening of a filler neck 5, the lower seal ring 1 still presses against the contact surface 12 and prevents the transpiration of gasoline vapor. The work of the lower seal ring 1 in this case is the same as in the case of the screw-type fuel cap described above and therefore will not be described again here.

In this bayonet-type fuel cap also, the outer diameter of the lower seal ring 1 (the outer periphery of the elastic support part 15) and hence the inner diameter of the contact surface 12 substantially the same as the inner diameter of the engagement ring 20. Then, on closing of the fuel cap, when the lower seal ring 1 is pressed against the contact surface 12, the engagement projections 21 of the closure 3 and the engagement ring 20 of the filler mouth tube 7 automatically become concentric and could be screwed together easily. In this case, the lower seal ring 1 may preferably be positioned in relation to the engagement of the engagement projections 21 with the engagement ring 20 so that the lower seal ring 1 starts to press against the contact surface 12 when that engagement is between 0° and 45°.

With the present invention, (1) in the case of a screw-type fuel cap, it is to greatly raise sealing effect and, while exploiting previously existing merits of screw-type fuel cap, prevent the transpiration of gasoline vapor until the fuel cap is fully open and secure sealing effect until the fuel cap is fully open even when the closure is turned by an impact. And (2) in the case of a bayonet-type fuel cap, it is to prevent the eruption of fuel caused by a pressure difference between inside and outside the tank and secure sealing effect even when the closure is turned by an impact.

What is claimed is:

1. A fuel cap for automobiles, which is a screw-type fuel cap, comprising:
   a closure mounting an upper seal ring and a lower seal ring individually thereon, and
   a handle integrally constructed with the closure, wherein
      the upper seal ring is mounted on the closure at the position to be unsealed with a filler neck when the closure starts to be turned off,
      the lower seal ring is mounted on the closure at the position to release a sealing condition of the filler neck when the closure is completely removed from the filler neck, and the lower seal ring has a cross-section comprising:
         a ring base attached to the closure;
         an umbrella-shaped part extending with the ring base in a direction to an inner wall of the filler neck with downward pitch;
         an elastic support part provided at the edge of the umbrella-shaped part contacting in pressure against the inner wall of the filler neck; and
         a lip part extending from the elastic support part in a direction to the closure with downward pitch.

* * * * *